(12) United States Patent
Budrikis et al.

(10) Patent No.: US 6,876,670 B1
(45) Date of Patent: Apr. 5, 2005

(54) METHOD AND APPARATUS FOR TRANSFER OF REAL TIME SIGNALS OVER PACKET NETWORKS

(75) Inventors: Zigmantas L Budrikis, Dalkeith (AU); Guven Mercankosk, Beldon (AU); John Siliquini, Dianella (AU)

(73) Assignee: Curtin University of Technology, Bentley (AU)

( * ) Notice: Subject to any disclaimer, the term of this patent is extended or adjusted under 35 U.S.C. 154(b) by 0 days.

(21) Appl. No.: 09/462,562

(22) PCT Filed: May 19, 1999

(86) PCT No.: PCT/AU99/00396

§ 371 (c)(1),
(2), (4) Date: Jan. 10, 2000

(87) PCT Pub. No.: WO99/60755

PCT Pub. Date: Nov. 25, 1999

(30) Foreign Application Priority Data

May 19, 1998 (AU) ............................................... PP3624

(51) Int. Cl.[7] .................................................. H04J 3/24
(52) U.S. Cl. ...................... 370/474; 370/468; 370/486; 370/516; 348/500; 348/512; 375/240.28; 375/240.25
(58) Field of Search ................................. 370/474, 468, 370/486, 516, 517, 485, 487, 521, 537, 477, 260; 725/95, 96; 348/512, 500; 375/240.26, 240.28, 371, 240.25

(56) References Cited

U.S. PATENT DOCUMENTS

| | | | |
|---|---|---|---|
| 4,506,358 A | | 3/1985 | Montgomery |
| 4,894,823 A | | 1/1990 | Adelmann |
| 5,521,927 A | * | 5/1996 | Kim et al. .................. 370/474 |
| 5,535,209 A | | 7/1996 | Glaser et al. |
| 5,565,923 A | * | 10/1996 | Zdepski .................. 375/240.26 |
| 5,602,992 A | * | 2/1997 | Danneels ..................... 709/248 |
| 5,790,543 A | * | 8/1998 | Cloutier ....................... 370/252 |
| 5,805,602 A | * | 9/1998 | Cloutier et al. ............. 370/516 |
| 5,867,230 A | | 2/1999 | Wang et al. |
| 5,966,387 A | * | 10/1999 | Cloutier ....................... 370/516 |
| 6,064,676 A | * | 5/2000 | Slattery et al. ............. 370/412 |

(Continued)

OTHER PUBLICATIONS

"Transporting MPEG–II Video Streams on ATM Networks with a modified J–EDD Scheme" (Hou et al) Malaysian Journal of Computer Science vol. 10, No. 2 Dec. 1997, pp. 17–25 especially section 3.1.

*Primary Examiner*—Wellington Chin
*Assistant Examiner*—Chuong Ho
(74) *Attorney, Agent, or Firm*—Oblon, Spivak, McClelland, Maier & Neustadt, P.C.

(57) ABSTRACT

The present invention allows routers in a digital communications network, such as the Internet, to be given the time awareness that is necessary for timely transfer of real time signals in the form of digital data packets. Timing information generated at the source of the signal is included in the packets in the form of first and second time stamps, which are used by network routers to establish dispatch deadlines by which the packets must be forwarded to ensure time-faithful reconstruction of the real time signal at the destination. The same timing information can be used at the destination to synchronize the clock for presentation of the real time signal to the source clock. The first and second time stamps (a differential time and a dispatch time) are derived by a transmitter unit (100) from a counter (118) that counts pulses from an oscillator (116) that most advantageously is locked to an integer multiple or a fraction of a universally available time measure. Assuming that the same time measure, or at least a very near replica, is available at routers in the network and at destinations connected to the network, the time stamps marked in the packets can be used by routers to effect scheduling for timely dispatch of the packets.

26 Claims, 9 Drawing Sheets

U.S. PATENT DOCUMENTS

| | | | |
|---|---|---|---|
| 6,111,896 A | * | 8/2000 | Slattery et al. ............. 370/535 |
| 6,148,082 A | * | 11/2000 | Slattery et al. ............. 380/212 |
| 6,175,872 B1 | * | 1/2001 | Neumann et al. ........... 709/231 |
| 6,195,368 B1 | * | 2/2001 | Gratacap .................... 370/535 |
| 6,246,701 B1 | * | 6/2001 | Slattery ...................... 370/503 |
| 6,292,490 B1 | * | 9/2001 | Gratacap et al. ............. 370/412 |
| 6,351,471 B1 | * | 2/2002 | Robinett et al. ............ 370/468 |
| 6,351,474 B1 | * | 2/2002 | Robinett et al. ............ 370/486 |
| 6,449,291 B1 | * | 9/2002 | Burns et al. ................. 370/516 |

* cited by examiner

METHOD AND APPARATUS FOR TRANSFER OF REAL TIME SIGNALS OVER PACKET NETWORKS

FIELD OF THE INVENTION

This invention relates to digital packet transmission of real time information and, more particularly, to timely delivery of information packets and to synchronisation of packet transmitted real time signals.

BACKGROUND TO THE INVENTION

Different digital packet networks exist and are well known. There is hardly an office or campus without one or more local area packet networks. There are also higher layer networks that carry digital packets over successions of local and wide area networks, using some inter-networking protocol. The most ubiquitous and best known is the Internet. The invention relates to the transfer of real time signals over any and all of such digital communications networks.

The Internet and most local area networks are connectionless. Packets are routed and carried independently of each other to selected destinations on the basis of the destination address as given in the header of the packet. Also, as part of being connectionless, there is no reserved bandwidth for the carriage of packets between any particular source and destination pair, such carriage without reserved bandwidth being referred to as unresourced. Resourcing of packet carriage between any source and destination pair is feasible only if the carriage is along a particular path, i.e. is connection-oriented.

Connectionless local and wide area networks were developed for computer data communications which have no strict time constraints, and for which the networks are completely adequate and eminently suitable. Connectionless networks, and particularly the Internet, have come to be increasingly used also for real time communication, such as telephony and video conferencing for which such networks are, or will prove to be, manifestly inadequate. Given connectionless transfer without any access control, a network is exposed to the possibility of traffic overload. While the only effect of overloads is to slow down non-time sensitive data communications, they result in unacceptable delays in real time communications, causing disruption in the reception of the real time signal.

Disruption of real time communications by general network overloads can be reduced by providing a higher priority service in the network to them. But this can only be effective until the traffic at higher priority service in itself reaches overload proportions. To provide dependable and sustainable communications a network, including the Internet, needs to be connection-oriented with possibility of bandwidth reservation on connections, at least in regard to real time transfers.

Although bandwidth reservation is necessary for transfer of a real time signal, it is not of itself sufficient to assure timely transfer of the signal. Mere reservation of bandwidth would result in timely transfer if the signal had a constant rate, i.e. was carried in fixed size packets sent at regular intervals. Timely transfer is not possible if the signal has a variable rate—variable length packets, or packets at variable intervals, or both. To assure timeliness in the transfer of a variable rate signal, the network needs to forward packets in accordance with each packet's time requirements, on or before the deadline applicable to the packet. To accomplish that, network routers need to be time aware with respect to every packet on every established real time connection.

SUMMARY OF THE INVENTION

The present invention was developed with a view to providing a method and apparatus for timely transfer over a communications network of real time signals even when carried in irregularly spaced and/or variably sized information packets, and for recovery of source clock at destination. Examples of signals that may advantageously be transferred by irregular packets, but nonetheless require timely delivery and recovery of source clock are compressed video and compressed sound in real time communication such as telephony and teleconferencing.

Throughout this specification the term "comprising" is used inclusively, in the sense that there may be other features and/or steps included in the invention not expressly defined or comprehended in the features or steps specifically defined or described. What such other features and/or steps may include will be apparent from the specification read as a whole.

According to a first aspect of the present invention there is provided a method of transmitting real time signals as digital data packets over a communications network, the method comprising:

providing first and second time stamps in each packet of a real time signal required to be transmitted, said first time stamp indicating the elapsed time of the real time information represented by the data carried in the packet and said second time stamp indicating a time at which assembly of the packet at a source had occurred, and wherein said time stamps are derived from a universal time measure available to the source, a destination and routing points in the network whereby, in use, timely transfer en route and time-faithful reconstruction of the real time signal at the destination is possible.

According to a second aspect of the present invention there is provided a transmitting apparatus for transmitting real time signals at a source as digital data packets over a communications network, the transmitting apparatus comprising:

means for inserting first and second time stamps in each packet of a real time signal required to be transmitted at the source, said first time stamp indicating the elapsed time of the real time information represented by the data carried in the packet and said second time stamp indicating a time at which assembly of the packet at a source had occurred, and wherein said time stamps are derived from a universal time measure available to the source, a destination and routing points in the network whereby, in use, timely transfer en route and time-faithful reconstruction of the real time signal at the destination is possible.

According to a third aspect of the present invention there is provided a routing apparatus for routing real time signals as digital data packets over a communications network, the routing apparatus comprising:

means for retrieving first and second time stamps from each packet of a real time signal required to be routed, said first time stamp indicating the elapsed time of the real time information represented by the data carried in the packet and said second time stamp indicating a time at which assembly of the packet at a source had occurred, and wherein said time stamps are derived from a universal time measure available to the source, a destination and routing points in the network; and, means for supervising dispatch of each of said packets in sequence by determining a target time for latest completion of dispatch of the next succeeding packet using the first time stamp in a packet whereby, in use, successive packets are substantially always despatched ahead of, or on, scheduled time.

Preferably the routing apparatus further comprises:

means for imposing an enforced wait in the timing of dispatch of a first packet by a predetermined time interval selected to be short enough to introduce an acceptable contribution by a routing apparatus to the total delay of the real time signal and long enough to provide sufficient time margins for the timely dispatch of subsequent packets.

Preferably the routing apparatus further comprises:

means for confirming that a packet is the next successive packet in sequence of the real time signal by comparing its first time stamp with a the first time stamp of the previous packet.

According to a fourth aspect of the present invention there is provided a method of routing real time signals as digital data packets over a communications network, the method comprising:

retrieving first and second time stamps from each packet of a real time signal required to be routed, said first time stamp indicating the elapsed time of the real time information represented by the data carried in the packet and said second time stamp indicating a time at which assembly of the packet at a source had occurred, and wherein said time stamps are derived from a universal time measure available to the source, a destination and routing points in the network;

supervising dispatch of each of said packets in sequence by determining a target time for latest completion of dispatch of the next succeeding packet using the first time stamp in a packet whereby, in use, successive packets are substantially always despatched ahead of, or on, scheduled time.

Preferably the method of routing further comprises:

confirming that a packet is the next successive packet in sequence of the real time signal by comparing its first time stamp with the first time stamp of the previous packet.

According to a fifth aspect of the present invention there is provided a receiving apparatus for receiving real time signals at a destination as digital data packets over a communications network, the receiving apparatus comprising:

means for retrieving a first time stamp from a packet of a real time signal required to be presented at the destination, said first time stamp indicating the elapsed time of the real time information represented by the data carried in the packet, and wherein said first time stamp is derived from a universal time measure available to a source, the destination and routing points in the network;

a presentation timing clock for controlling the timing of presentation of the real time signal at the destination; and, means for adjusting the presentation timing clock based on a comparison of the first time stamp with the actual time taken to present the real time information represented by the data carried in the packet whereby, in use, a timing clock at the source can be recovered to ensure time-faithful reconstruction of the real time signal at the destination.

Throughout this specification the term "universal time measure" is to be understood to refer to an arrangement whereby reference oscillators provided at the transmitter, routers and receivers are isochronic, or at least plesiochronic, with each other, or at least up to an integer multiple of each other. To be isochronic the reference oscillators may be locked to a common frequency source, for instance the reference oscillation that is universally receivable from a geopositioning satellite (GPS). To be plesiochronic with each other, the reference oscillators must be of the same nominal frequency and appropriately high accuracy, or each may be locked to a standard oscillator that is plesiochronically related to the others.

BRIEF DESCRIPTION OF THE DRAWINGS

In order to facilitate a better understanding of the present invention, a preferred embodiment of the method and apparatus for transmitting real time signals will now be described in detail, by way of example only, with reference to the accompanying drawings, in which.

DETAILED DESCRIPTION OF PREFERRED EMBODIMENT

Figure 1:
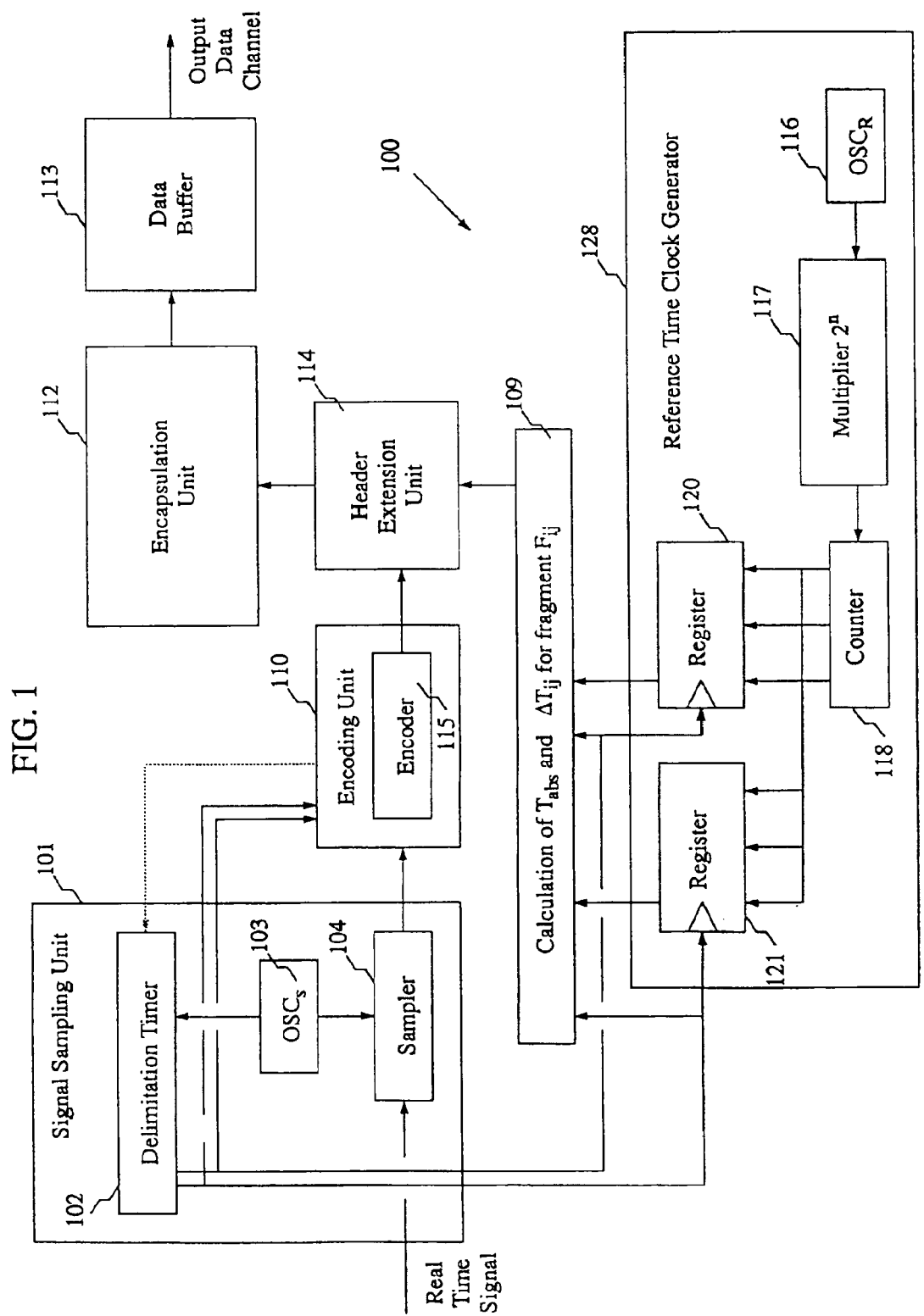
FIG. 1 shows, in simplified block diagram form, a preferred embodiment of a real time application specific transmitter unit in accordance with the present invention.

A central element of the preferred method and apparatus according to the invention is the provision of a differential time stamp. This is included by the real time signal source in a designated field of every packet carrying the signal. It is a number that indicates the interval of time that is spanned by the segment of signal represented in the payload of the given packet. Other items of information that are advantageously included by the source in similarly designated fields of every packet are:

(i) the fact that the packet is on a real time connection, (ii) whether the packet is at the start of a real time episode or a continuation, (iii) the dispatch time (by a clock at the source) at which assembly of the packet had commenced.

First and second time stamps (the differential time and the dispatch time) are derived by the source from a counter that counts pulses from an oscillator that most advantageously is locked to an integer multiple or fraction of a universally available frequency source. Assuming that the same frequency source, or at least a very near replica, is available at routers in the network and at destinations connected to the network, the time stamps marked in packets can be used by routers to effect scheduling for timely dispatch of the packets, and by the destinations to recover the clock with which the source had generated the signal.

In a preferred embodiment of a router, constructed in accordance with the principles of the invention, the procedure on arrival of a packet is to determine whether the packet is on a bona fide real time connection, and therefore requiring timely dispatch. If yes, then it determines whether it is the first packet in a real time episode, or a continuation packet. If it is the first packet of a real time episode, the router schedules it for dispatch WAIT units of time after its arrival. An enforced wait of the first packet by a predetermined interval WAIT is selected to be short enough to be an acceptable contribution by a router to the total delay of the signal and long enough to provide a sufficient time margin for the timely dispatch ahead of subsequent continuation packets. The value of WAIT may be connection dependent, set at connection set-up, and may be smaller for higher rate and delay intolerant transfers.

On completion of dispatch of the first packet of an episode, the router notes the time of dispatch completion, as determined from its own clock (locked however to a universal time measure). It adds to this the time interval represented by the differential time stamp in the packet just dispatched, so determining the target time for latest completion of dispatch for the next (continuation) packet on the given connection.

On arrival of a continuation packet on a bona fide real time connection the router checks that it is the next packet in sequence, by comparing its dispatch time stamp with the dispatch time stamp plus the differential time stamp of the previous packet. If the comparison does not give a match, then the packet is treated as a first packet of an episode in the manner already summarised for an actual first packet. But if it matches, then the packet is scheduled for latest start of departure, where this is calculated from the recorded time of latest completion of dispatch by subtracting a time interval equal to the length of the packet in bits divided by the rate in bits/second of the link on which the packet will be dispatched. At the same time a new target for latest completion of dispatch is calculated by adding the value of the differential time stamp in the present packet to the existing target for latest completion of dispatch.

In the dispatch of packets other than of the first packets of real time episodes, the router does not wait for occurrence of any target time, rather, at the next opportunity, it dispatches the packet with the lowest scheduled start of dispatch. Only in the absence of any packets with scheduled starts of dispatch, will the router dispatch an unscheduled packet, i.e. a connectionless packet or a packet on a non-real time connection.

The router ensures that, with very high probability, packets on real time connections are always dispatched ahead of, or on, scheduled time. It does so by admitting a further real time connection only when the additional traffic, scaled by its WAIT parameter value, will not push the aggregate real time traffic commitment above a set threshold.

A destination may commence presentation of a real time signal as soon as the first packet has arrived. It uses a presentation clock that is nominally the same as the signal generation clock at the source. The destination brings the presentation clock into synchrony with the signal generation clock by comparing the time taken to present the signal derived from the information in a packet, again measured against a universal time measure, with the time interval disclosed in the differential time stamp of the packet. If the measured time is larger (smaller) than the differential time stamp, then the presentation clock needs to be made to go faster (slower).

If the last router along the connection successfully dispatches all packets on or before schedule, the presentation at the destination will be time-continuous. The next packet in a real time sequence will have arrived at the destination on or before the contents of the previous packet have been completed in presentation. The successful dispatch on schedule by any router, including the last, will depend only on the traffic load at the router, provided that routers upstream of it have successfully dispatched on or before their schedules. A router can still successfully dispatch on or before schedule, even if the immediately previous router has missed its scheduled deadline, so long as the overrun in the upstream router is less than the WAIT value in the downstream router.

The locking of presentation clock at destination to signal generating clock at source by means of differential time stamps, does not depend on time-continuity of the presentation. Even if a packet arrives late and causes a gap in presentation, or a gap is caused by packet loss, the comparison of presentation clock with signal clock is possible during presentation of signal from each of the packets as have arrived. Thus recovery at destination of the source clock is still possible, even when real time signals are transferred as connectionless packets (as for instance they might be over the present Internet).

Note, there is no restriction on how the time stamps of the invention are constructed. They could for instance be ordinary binary integers, say, forty bits long for the differential time stamp and sixty-four bits long for dispatch time stamp, with units in each case on the order of one nanosecond. But equally they could be constructed as integer pairs, one giving a value and the other the number of trailing binary zeros, and units on the order of one picosecond. What the construction, the fields, and the units are, is a matter for convention in standards.

Figure 2:
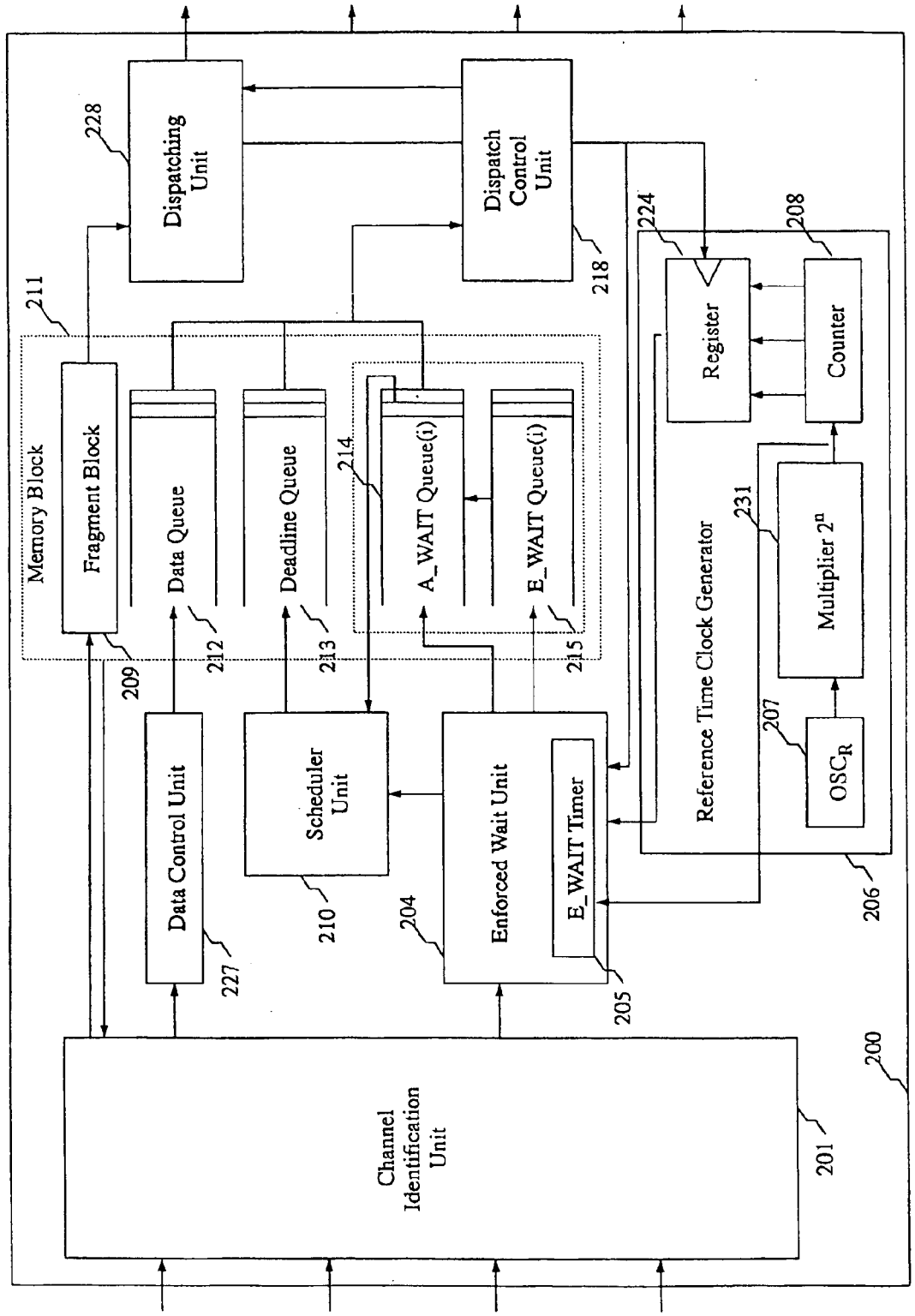
FIG. 2 shows, in simplified block diagram form, a preferred embodiment of a router unit, with detail only of real time connection processing.
Figure 7:
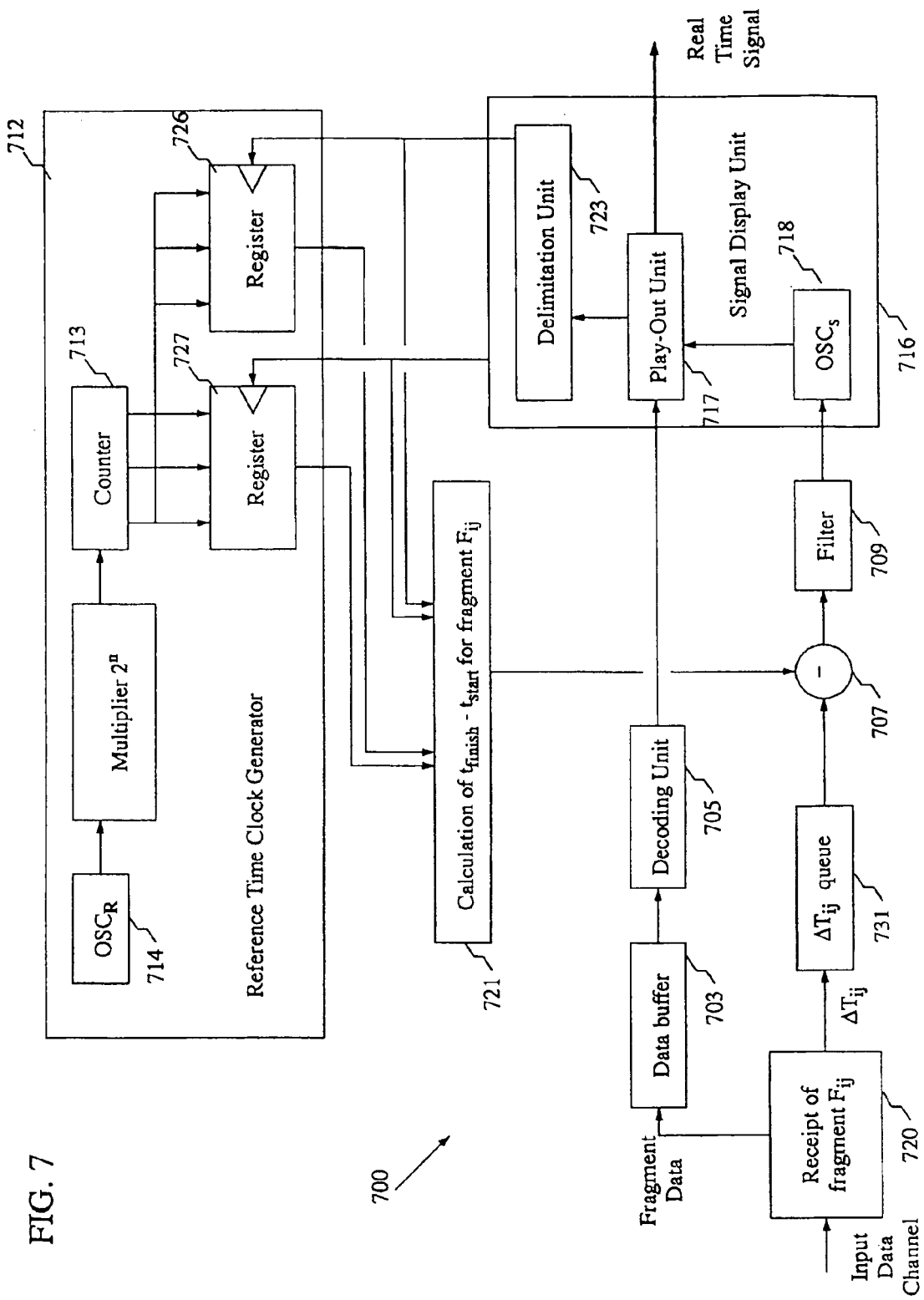
FIG. 7 shows, in simplified block diagram form, a preferred embodiment of a real time application specific receiver unit in accordance with the present invention.

Without loss of generality and for the sake of illustration, we consider the transfer of a single real time signal from a real time application specific transmitter unit 100 of FIG. 1 over a network of router units 200 illustrated in FIG. 2 to a real time application specific receiver unit 700 of FIG. 7. For the transfer of real time signals, protocol data units (PDUs) with appropriate extension of header for real time, are used. Each PDU or packet in a flow represents a fragment of the real time signal. All packets in the flow in this example are transferred over the same network connection and follow the same route.

The real time application specific transmitter unit 100 of FIG. 1 includes a signal sampling unit 101, a reference time clock generator unit 128, a timing calculation unit 109, an encoding unit 110, a network encapsulation unit 112 and a data buffer 113.

The signal sampling unit 101 includes an oscillator 103 (the application clock), a delimitation timer 102 and a sampler 104. The delimitation timer 102 determines the fragmentation of the sampled signal. Optionally, the delimitation timer 102 may be set by the encoding unit 110. The digital output 106 from the signal sampler 104 and the fragment delimiters from the delimitation timer 102 are supplied to the encoding unit 110. The encoding unit 110 processes the presented fragment according to the encoder 115 being utilised and its output is supplied to the header extension unit 114. The fragment delimiter signals are also used to latch the fragment start and finishing times values, respectively from a reference time clock generator unit 128.

The reference time clock generator 128 includes an oscillator 116, optionally a frequency multiplier 117, a cycle counter 118 and two latch registers 120 and 121. For timely transfer of a real time signal, it is preferred that the reference time at router units 200, at the transmitter unit 100 and receiver unit 700 be isochronic, or at least plesiochronic, with each other, or be isochronic, or plesiochronic with each other at least up to an integer multiple of each other. The reference time measures can be isochronic if the reference oscillators 116, 207, and 714 are locked to a common source, for instance the reference oscillation that is universally receivable from a geopositioning satellite (GPS). To be plesiochronic with each other, the reference oscillators 116, 207, and 714 must be of the same nominal frequency and appropriately high accuracy, or each must be locked to a standard oscillator that is plesiochronically related to the others.

The multiplier 117 multiplies the frequency $f_0$ from oscillator 116 by a constant. Advantageously the multiplying constant is a power of 2, e.g. $2^n$, where n is an integer, and the adopted unit $t_u$ for measurement of time in the present context is related to $f_0$ also by a power of 2, e.g. $t_u=1/2^N f_0$, where N would be fixed with consideration that $t_u$ should be, say, on the order of one picosecond, and thereby small enough not to require subdivision for any foreseeable measurements of communications timeliness.

Figure 8:
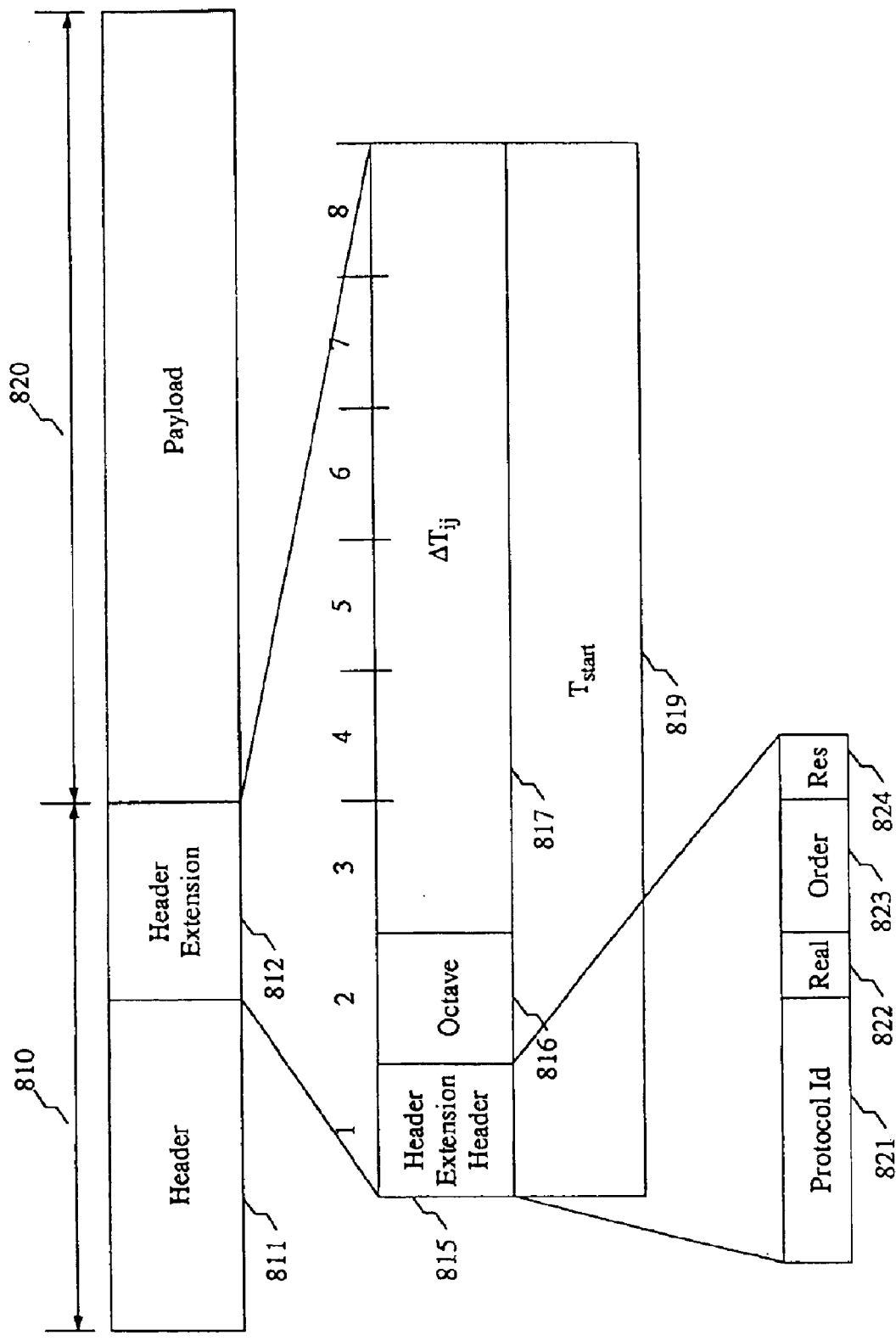
FIG. 8 shows a possible format for a network protocol data unit including a real time header extension in accordance with the present invention.

The advantage in powers of 2 for the multiplication of frequency/time scales is in the simplicity that this affords to time stamp construction and manipulation. FIG. 8 gives an illustration of a network protocol data unit (N-PDU) 800, containing a header extension 812 that contains fields for first and second time stamps $\Delta T$, 817, and $T_{abs}$, 819, as typically employed in the invention. The time stamps are positive binary integers: in the illustration $T_{abs}$ is an integer of 64 bits and $\Delta T$ is an integer of 48 bits. At the start of a real time segment, delimitation timer 102 sends a latch pulse to the reference time clock generator 128, latching the count in counter 118 into register 121 and whence transferring it as $t_{start}$ to 109. This count is transferred by 109 without alteration as $T_{abs}$ to the header extension generator unit 114. On completion of the segment, delimitation timer 102 sends a latch pulse to the reference time clock generator 128, latching the content in counter 118 into register 120 and whence transferring it as $t_{finish}$ to 109. In 109 $t_{start}$ would be subtracted from $t_{finish}$, and if positive, the result of the subtraction is transferred as $\Delta T_{if}$ to header extension generator unit 114. If the result of the subtraction is negative, $2^{65}$ is added to it, making it positive and this value is transferred as $\Delta T_{if}$ to header extension generator unit 114.

The value of n in the multiplier constant $2^n$ is particular to the transmitter unit 100. Other transmitter units, as also routers 200 and receivers 700, may have different values of n for $2^n$. The constant that is common to all is the unit of time $t_u$, which is assumed to be fixed by standard. It is therefore necessary that information in regard to the frequency $f_0$ of the reference oscillator 116 and the power n of the multiplier 117 be included in the real time header extension 812. In the example this is included as "Octave" 816, shown as an 8 bit binary integer. The value of "Octave" will express the number of trailing zeros that would need to be appended to the time stamps $T_{abs}$ and $\Delta T$ if these were in units of $t_u$. With the illustrative assumptions made for routers 200, "Octave"= N−n.

A fragment as delimited by delimitation timer 102 is encoded as a packet payload 820 by encoder 115 and transferred to header extension insertion unit 114. The header extension 812 contains a header extension header 815, Octave field 816 and first and second time stamps $\Delta T$ 817 and $T_{abs}$ 819 respectively. Header extension header 815 may, for instance, have a 4-bit protocol identifier 821, a one-bit REAL tag 822, a two-bit ORDER field 823, and a reserved bit 824. When set, the REAL tag 822 would indicate that the fragment is on a real time connection. ORDER field 823 has four code points, of which the first (0,1) may indicate that the fragment is at START of Episode (SOE), the second (1,0) that it is Continuation of Episode (COE), and the third (1,1) that it is a Single Fragment Episode (SFE). ORDER=(0,0) may be undefined.

The service data unit of payload 820 and prepended header extension 812 is passed to the network encapsulation unit 112, where network header 811 is prepended. The resultant protocol data unit 800 is passed to output buffer 113, whence it is placed at the earliest opportunity on the output data channel.

A preferred embodiment of a router unit will now be described with references to FIGS. 2, 3, 4, 5 and 6. The router unit 200 includes at least one channel identification unit 201, at least one memory block 211, a reference time generator 206, a data control unit 227, and possibly for each output data link at least the following units: an enforced wait unit 205, a scheduler unit 210, a dispatch control unit 218, and a dispatching unit 228. A plurality of input data links, each carrying a plurality of data channels, connect to the channel identification unit 201. A corresponding plurality of output data links, each carrying a plurality of data channels, are provided at the output of the router 200. For the sake of clarity, we limit the description to only one output data link. Design options allow for the sharing of some units within the router.

On arrival of a packet or fragment, the channel identification unit 201 copies all header information, including header extension, if present, and passes the entire packet to memory block 211, where it is stored in fragment block 209. The address pointer to fragment block 209 is returned by the memory block 211 to the channel identification unit 201 which appends it to the header information. The channel identification unit 201 determines whether the fragment is on a bona fide real time connection. If it is not, then the header information and address pointer of the fragment block 209 are passed to the data control unit 227 for non-real time processing (from where eventually the address pointer will be added to the data queue 212 of the appropriate output link). However if the fragment is on a bona fide real time connection then channel identification unit 201 identifies the connection i that the fragment belongs to (e.g. from transmitter and receiver network addresses or from flow label), and transmits to the enforced wait unit 204 of the appropriate output link, the connection number, the length $L_{ij}$ of the fragment, the extension header and the address pointer. The connection number, fragment length, extension header and address pointer are collectively the router transfer information of a real time packet.

Timely transfer of fragments typically requires the dispatch of the first fragment to be delayed for at least a specified WAITi time units. Depending on the connection state, the timing data associated with the fragments can be placed in one of three queues, namely E_WAIT queue 215, A_WAIT queue 214 and DEADLINE queue 213. Each item in the E_WAIT queue 215 or A_WAIT queue includes the address pointer to the associated fragment block 209 an the associated timing data. Each item in the DEADLINE queue 213 includes the address pointer to the associated fragment block 209 and the latest start time for the dispatch of the fragment.

The reference time clock generator unit 206 includes an oscillator 207, optionally a frequency multiplier 231, a cycle counter 208 and a latch register 224. The register 224 is used to latch the value of the counter 208 on completion of dispatch 219 of the first fragment of an episode. The output of the register 224 is submitted to the enforced wait unit 204. The output of the frequency multiplier 231 is also submitted to the enforced wait unit 204 to drive an E_WAIT timer 205.

Figure 4A:
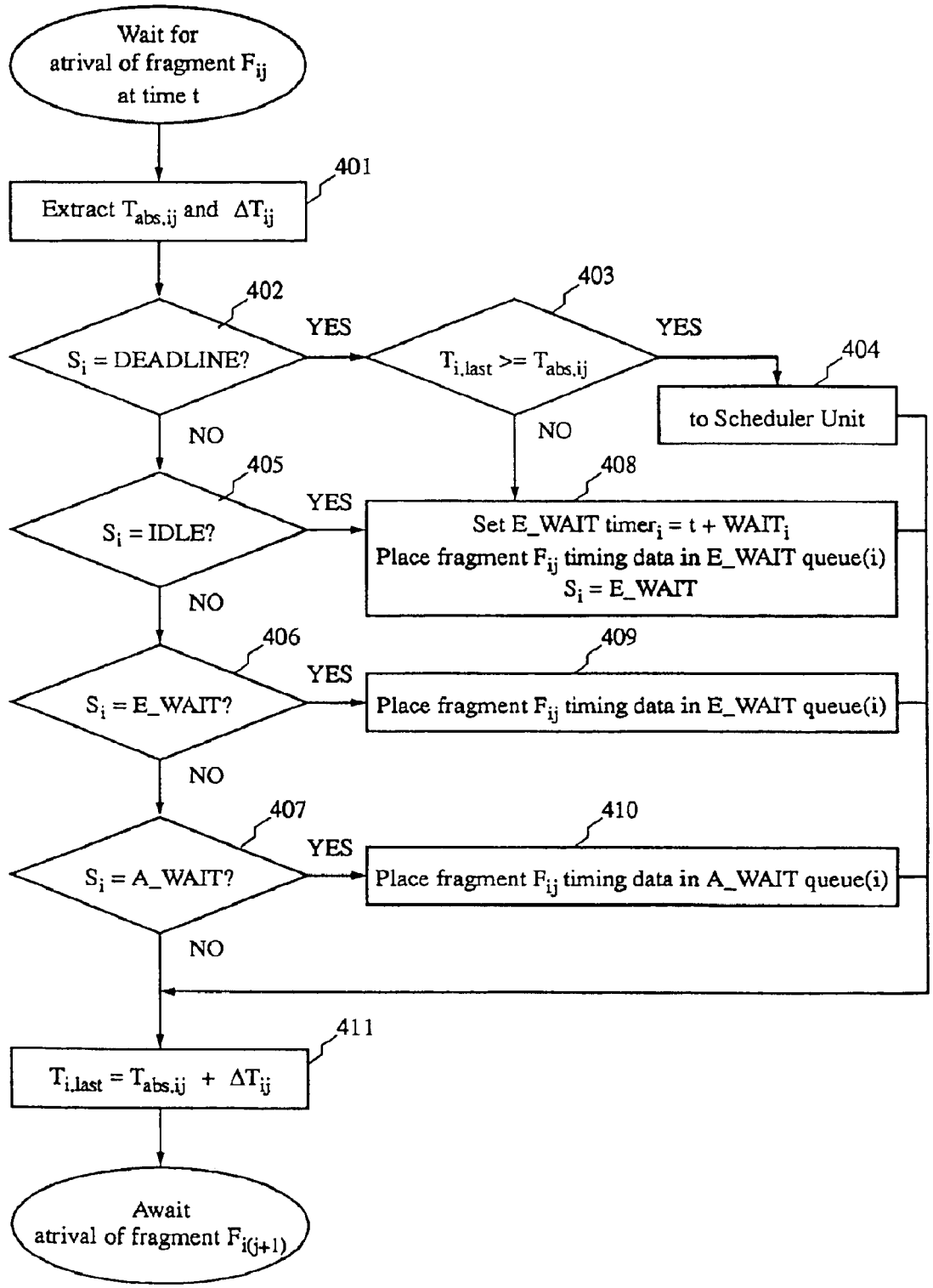
FIG. 4 shows a flow diagram for a processor in the router of FIG. 2 implementing enforced wait of the first segment of a real time episode.
Figure 4B:
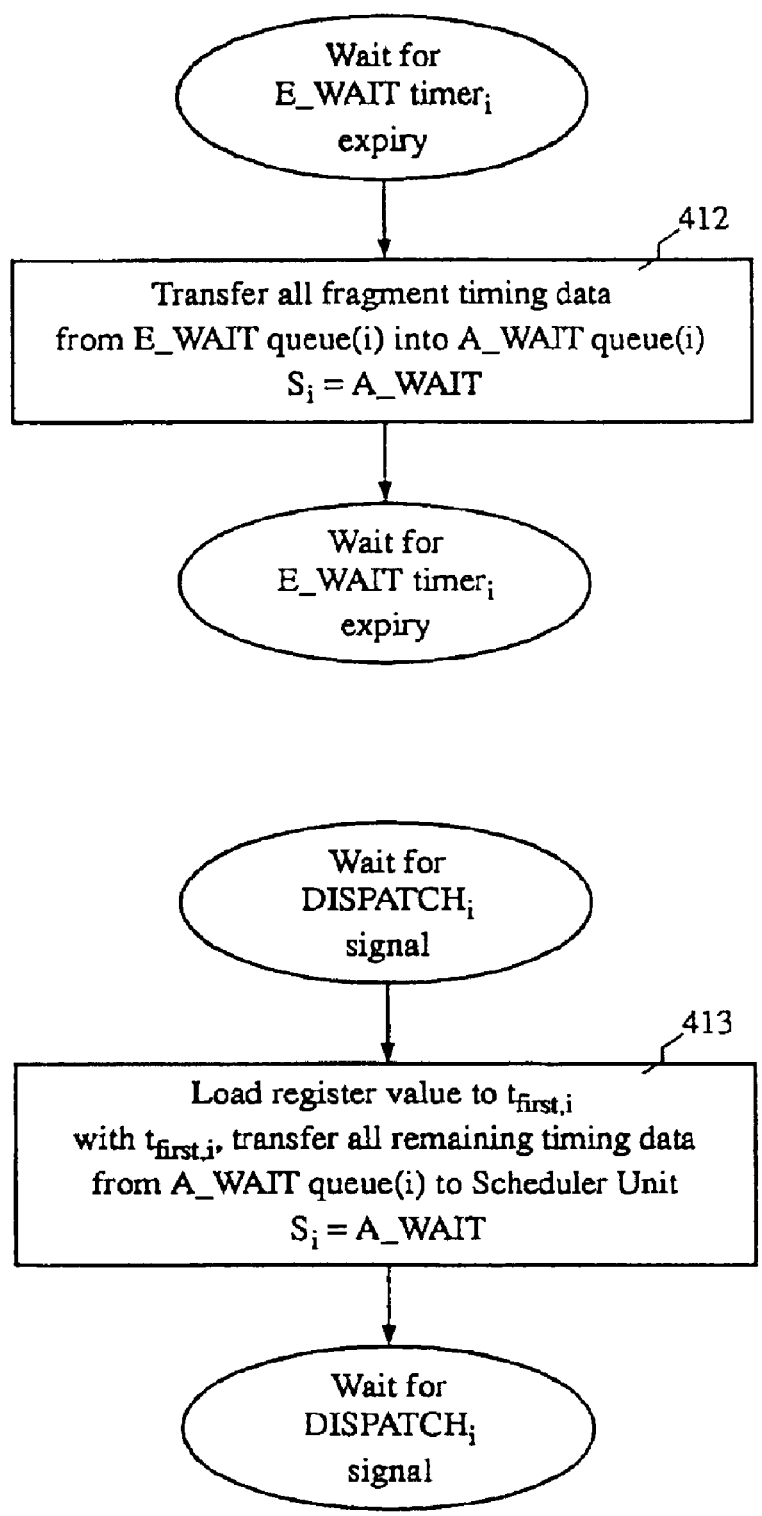

Operation of the enforced wait unit 204 will now be described with reference to FIGS. 2 and 4. Upon arrival of the first fragment, the enforced wait unit 204 places 408 the timing data in the E_WAIT queue 215, sets 408 the E_WAIT timer 205 to expire WAITi time units later and sets 408 the connection state to E_WAIT. The timing data of each fragment that arrives during the E_WAIT state are placed 409 in the E_WAIT queue 215. Upon expiry of the E_WAIT timer 205, the timing data in the E_WAIT queue 215 is transferred, 412 to A_WAIT queue 214 and the connection state is set 412 to A_WAIT state [FIG. 4(b)]. The timing data of each fragment that arrives during the A_WAIT state is placed 410 in the A_WAIT queue 214. Upon dispatch of the first fragment, the time of the dispatch is recorded 413 and transferred 413 to the scheduling unit 210, the connection state is set 413 to DEADLINE state and the timing data of each remaining fragment in the A_WAIT QUEUE 214 is submitted 413 to the scheduler unit 210. On arrival of a continuation fragment during the DEADLINE state, the enforced wait unit 204 checks that it is the next fragment in sequence, by comparing 403 its dispatch start time stamp with the dispatch time stamp of the previous fragment. If the comparison gives a match, then the timing data of the fragment is submitted, 404 to the scheduler unit. If it does not give a match, then the fragment is treated as the first fragment of an episode in the manner 408 already summarised for an actual first fragment.

Figure 3:
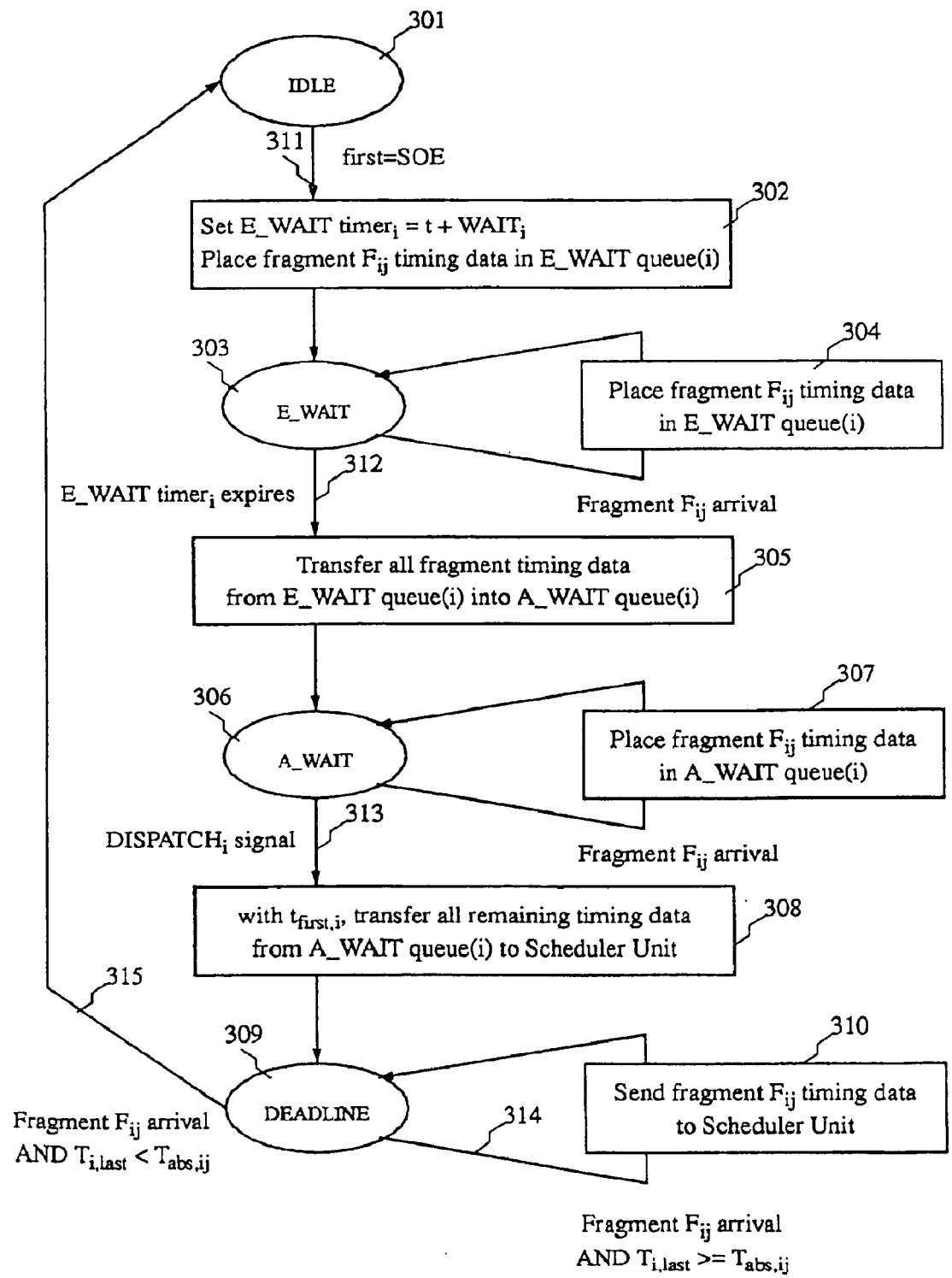
FIG. 3 shows a state diagram for a particular real time connection in the enforced wait unit of the router of FIG. 2.

In the State Diagram of FIG. 3, arrival of a fragment $F_{ij}$ occurs at time t. The extension header set includes First=ORDER, $Tabs_{ij}$=dispatch time, $\Delta T_{ij}$=differential time and $L_{ij}$=fragment length. After processing of the header set, $T_{i, last}=T_{abs, ij}+\Delta T_{ij}$. With respect to a given set up connection i, the enforced wait unit 204 at any given time is in one of four possible states 300: IDLE 301, E_WAIT 303, A_WAIT 306, and DEADLINE 309. The connection is in IDLE state 301 from connection set-up until arrival of the first segment. The connection is in the E_WAIT state 303 while awaiting the expiry of an imposed WAIT interval. WAIT is imposed on arrival of the first segment on the connection, and subsequently on the arrival of any segment following a break in the time continuity of segments. The connection transfers into the A_WAIT state 306 on expiry of a WAIT interval until dispatch of the segment that triggered WAIT. On dispatch of segment from the A_WAIT queue, the connection transits into DEADLINE state 309. While the connection is in the E_WAIT state 303, the router transfer information of incoming segments is directed to the E_WAIT queue 215, and while in the A_WAIT state to the A_WAIT queue 214. The start of the E_WAIT state is on arrival of a triggering segment, when the E_WAIT timer 205, instantiated for connection i, is set, and finishes with the expiry of E_WAIT timer 205. Transition from the E_WAIT to the A_WAIT state also transfers the content of E_WAIT queue 215 to the A_WAIT queue 214.

The E_WAIT and A_WAIT states are transient and short-lived, occurring briefly at starts of episode. The steady state of a connection is the DEADLINE state 309. The DEADLINE state 309 is entered from the A_WAIT state 306 on dispatch of segment for which transfer information is held in the A_WAIT queue 216. The time of the dispatch of a segment from A_WAIT is captured from counter 208 by latch into register 224, the latching signal coming from dispatch control unit 218. The time is local to the router, but is generated by oscillator 207 which is isochronically related to oscillator 116 (and 714). On dispatch of a segment with transfer information in A_WAIT queue, that transfer information and transfer information of any further segments is sent to the scheduler unit 210. The time of the completion of dispatch of the segment from A_WAIT is also sent (via the enforced wait unit 204) to the scheduler unit 210.

Only the start of episode (SOE) and single fragment episode (SFE) fragments, as have arrived at a router on a real time connection i, are dispatched on an "as soon as possible" basis, following a WAIT(i) period. Their pointer information is taken by dispatch control unit 218 from an A_WAIT(i) queue 214. Continuation of episode (COE) fragments are dispatched on an "on or before time" basis, with their pointer information taken by dispatch control unit 218 from the collective deadline queue 213. The information for each fragment in deadline queue 213, apart from pointer to fragment block 209, includes the time of latest start of dispatch, as determined by scheduler 210. Dispatch control unit 218 selects for next dispatch from deadline queue 213, the fragment with the smallest value of latest start of dispatch.

Figure 6:
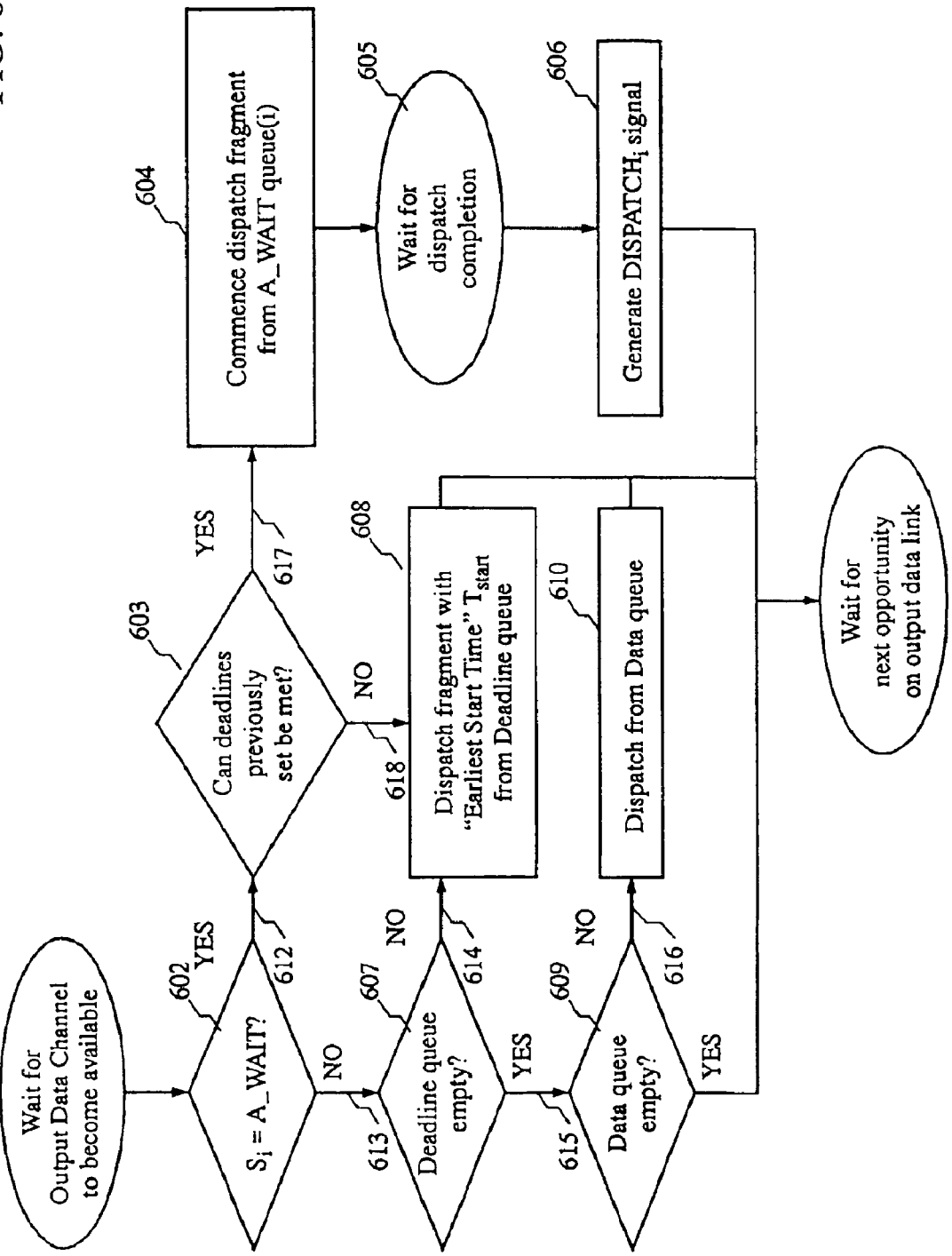
FIG. 6 shows, in simplified flow diagram form, the function of a dispatching unit in the router of FIG. 2.

Operation of the dispatch control unit 218 will now be described with reference to FIGS. 2 and 6. The dispatch control unit 218 serves the DEADLINE queue 213, the A_WAIT queue 214 of each connection which is in A_WAIT state and the DATA queue 212. Every time the output data channel becomes available for dispatch, the dispatch control unit 218 makes a decision 600 to select a queue to dispatch from. The dispatch control unit 218, may activate 610 a dispatch from the DATA queue 212 only when there is no connection 613 in A_WAIT state and the DEADLINE queue 213 is empty 615. If there is at least one connection 612 in A_WAIT state, the dispatching control unit 218 checks to see whether all deadlines previously set in the DEADLINE queue can still be met. The decision 603 is made on the basis the dispatch of all scheduled fragments always start before or on scheduled time with very high probability. Upon an affirmative decision 617, the dispatch control unit initiates 604 a dispatch from the chosen A_WAIT queue 214. Upon completion of the dispatch 604 the associated enforced wait unit 204 is notified 605. Otherwise, as well as when there are no connections 613 in A_WAIT state and DEADLINE queue is not empty 614, the dispatch control unit 218 dispatches 608 the fragment with the earliest start time from the DEADLINE queue 213.

Figure 5:
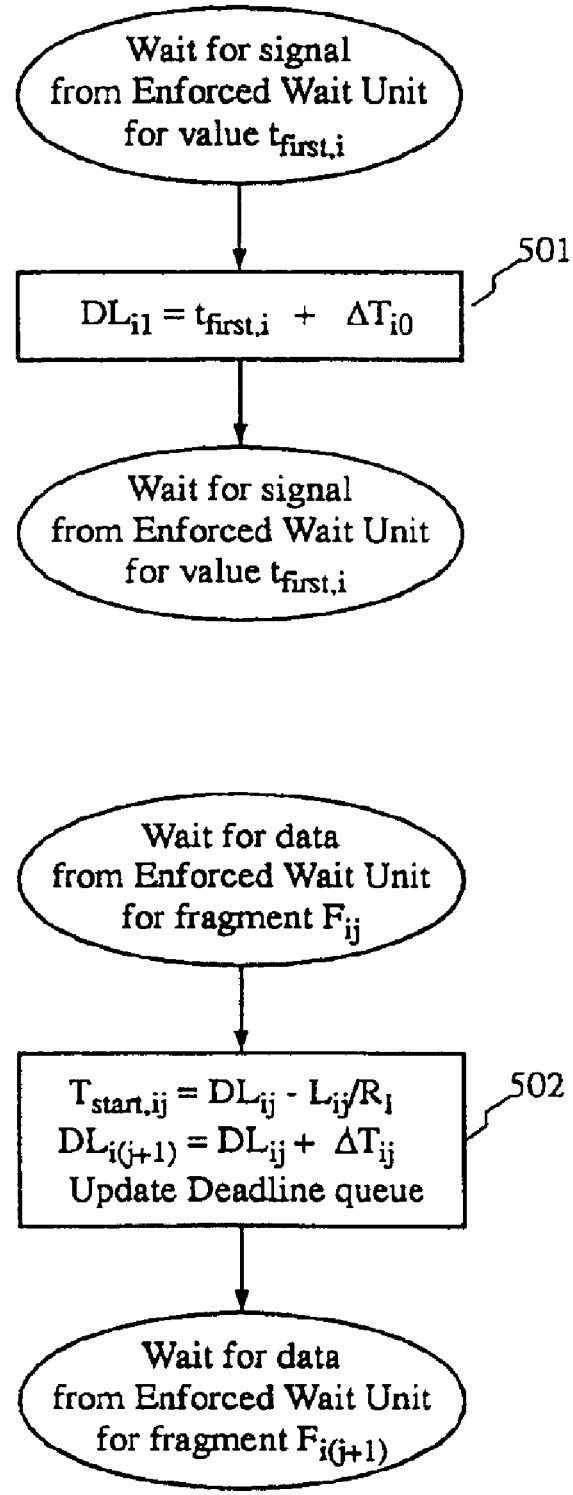
FIG. 5 shows function blocks for scheduling of first and continuation segments in a scheduler unit of the router of FIG. 2.

Operation of the scheduler unit 210 will now be described with reference to FIGS. 2 and 5. The scheduler unit 210 schedules each fragment which is forwarded by the enforced wait unit into the DEADLINE queue 213. Upon notification 223 of the completion of the dispatch of the first fragment of the episode, the scheduler unit 210 determines 501 the deadline for the completion of the dispatch of the second fragment of the episode. For each successive fragment the scheduling unit 210 first determines 502 the deadline for the start of the dispatch of the fragment by taking its length and the output data channel link rate into account and updates the DEADLINE queue 213. The scheduling unit 210 also determines 502 the time by which the dispatch of next fragment to be completed.

The determination by scheduler 210 of the latest start of dispatch for each COE fragment is as follows: To the time $t_{first,i}$ of completion of dispatch of an initial fragment of episode on connection i, as obtained from register 224 and passed on by enforced wait unit 204 to scheduler 210, the scheduler adds $\Delta T_{i1}$, the value of the differential time stamp carried by the initial segment, to determine $DL_{i1}$, the deadline for the completion of dispatch of first continuation fragment on connection i. When next a COE fragment on connection i arrives, the enforced wait unit 204 checks that it is time contiguous to the previous fragment and if so, sends its timing data to the scheduler unit 210. Scheduler 210 calculates the latest start of dispatch $T_{start,i1}$ by subtracting from the ratio of length $L_{i1}$ of the fragment, measured in bits, and $R_0$ the rate of the output link in bits per unit of time ($t_u$). At the same time, scheduler 210 produces $DL_{i2}$, the deadline for the completion of dispatch of the (yet to arrive) next COE fragment, by adding to $DL_{i1}$ the differential time stamp $\Delta T_{i1}$ carried in the previous COE fragment. Calculations of $T_{start,ij}$ and $DL_{ij+1}$ ends with arrival of j-th continuation fragment. Calculated $T_{start,ij}$ numbers are used in router 200 only for providing indications of priority for dispatch. In the overwhelming majority of instances, dispatches of continuation fragments will actually start at, or prior to, the calculated latest start times, because traffic conditions, controlled by connection admission which is outside the scope of this description, would assure that queues will rarely become large enough to deny dispatch on time. As a general rule, the dispatching unit 228 will never be idle while there is any fragment waiting for dispatch, with pointer information in an A_WAIT queue 214 or deadline queue 213 or data queue 212. At the completion of dispatch of a fragment, irrespective of what priority it may have been, the dispatch control unit 218 will select for dispatch in order of arrival into queue, a fragment from an A_WAIT queue 214, if there is one present, then, if none present in A_WAIT, a fragment from deadline queue 213, selecting the fragment with earliest latest start time, and, if no fragment present in A_WAIT or in deadline queue, selecting a segment from data queue 212.

A preferred embodiment of a receiver unit in accordance with the present invention will now be described with reference to FIGS. 7 and 8. The real time application specific receiver unit 700 includes a fragment receive unit 720, a data buffer 703, a decoding unit 705, a differential time stamp queue 731, a reference clock generator 712, a signal presentation unit 716, a presentation interval calculating unit 721, a local and received interval comparator 707 and a phase locked loop filter 709. The fragment receive unit 720 extracts the payload 820 of the received network protocol data unit 800 and places it in buffer 703. It also extracts the differential time stamp 817, aligns it in octave to local time stamps (713), and places it in queue 731.

The decoding unit 705 decodes each fragment, once complete in buffer 703, and passes the decoded fragment to play-out unit 717. Note that there is a one-to-one correspondence between the fragment payload as is decoded by decoding unit 705 and as was produced by the encoder 115 in transmitter unit 100 (see FIG. 1), and similarly between the decoded fragment in play-out unit 717 and the signal segment delimited by the delimitation timer 102 in transmitter unit 100. The reference clock generator 712 is in all respects similar to the reference time generator 128 in FIG. 1, including registers 726 and 727 which are similar in construction and function to registers 120 and 121.

Signal presentation unit 716 includes a voltage controlled oscillator 718, a play-out unit 717 and a delimitation unit 723. Voltage controlled oscillator 718 provides timing to play-out unit 717. Play-out unit 717 presents the real time signal, and identifies fragment boundaries which it submits to delimitation unit 723. In turn, the delimitation unit activates a latching signal to register 727 to latch $t_{start}$, the count in counter 713 at start of presentation of a fragment, and to register 726 to latch $t_{finsh}$, the count in counter 713 at completion of presentation of the fragment.

Time interval calculation unit 721 calculates the fragment presentation interval by subtracting $t_{start}$ from $t_{finsh}$. When measured and calculated over the presentation of fragment $F_{ij}$, the presentation interval should be equal to the time stamp $\Delta T_{ij}$, as retrieved from the fragment and is in queue 731. The two interval values are compared in subtraction unit 707. The difference is present to filter 709 which in response generates a control voltage for application to voltage controlled oscillator 718. If $\Delta T_{ij}$ is larger than ($t_{finish}-t_{start}$), the resulting control voltage will be such as to increase the frequency of voltage controlled oscillator 718, and, conversely, if smaller, then it will decrease the frequency of VCO 718. The result over time is to make the frequency of voltage controlled oscillator 718 the same as the frequency of application oscillator 103 in transmitter unit 100, and the nature of the system in this respect is that of a phase locked loop.

It will be apparent that the described method and apparatus of transmitting real time signals over a communications network provides a number of significant advantages. In its preferred form the present invention allows routers, or relays more generally, of a network such as the Internet, to be given the time awareness that is necessary for timely transfer of real time signals. Timing information generated at the source of the signal, is included in packets, and can be used by network routers or relays, for instance by Internet routers, to establish deadlines by which the packets need to be forwarded. The same timing information can be used at the destination to synchronize the clock for the presentation of the real time signal to the clock that generated the signal at the source.

The time awareness in a router with respect to a packet makes reference to preceding packets, if any, in the same transfer. Thus for timely transfer, it is preferred that all packets of a transfer go over the same sequence of routers, i.e. that they go over a set connection. There is no requirement of connection for the aspect of synchronizing the presentation clock to the source clock. However without timely delivery, there is no assurance of time-continuous presentation, even when the presentation clock is appropriately synchronized. Thus overall, the effectiveness of the method is typically dependent on the transfer of real time signals being connection-oriented.

Given the widely held expectation for real time communications over the Internet, the Internet should present the most prospective target for the present invention. As noted the Internet is for the time being entirely connectionless. However there are already proposals for endowing the Internet with at least some connection-oriented functionality. The best known is the resource reservation protocol (RSVP) (see RSVP Version 1 Functional Specification, R. Braden et al., RFC 2205, September 1997, http://www.sunsite.anc.dk/RFC/rfc/rfc2205.html). RSVP could establish bandwidth-resourced connections for some intervals, or even entire durations, of real time signal transfers. But such connections would not be endowed with any assured capability of timely, time-continuous signal transfer. With the present invention folded into the RSVP, the connections could be so endowed.

Numerous variations and modifications will suggest themselves to persons skilled in the digital communications and electronics arts in addition to those already described without departing from the basic inventive concepts. All such variations and modifications are to be considered within the scope of the present invention, the nature of which is to be determined from the foregoing description.

What is claimed is:

1. A method of transmitting real time signals as digital data packets over a communications network, the method comprising:

providing first and second time stamps in each packet of a real time signal required to be transmitted, said first time stamp indicating an elapsed time of real time information represented by data carried in the packet and said second time stamp indicating a time at which assembly of the packet at a source had occurred, and wherein said first and second time stamps are derived from a universal time measure available to the source, a destination and routing points in the communications network whereby, in use, timely transfer en route and time-faithful reconstruction of the real time signal at the destination is possible.

2. A method of transmitting real time signals as defined in claim 1, wherein said first and second time stamps are provided in the form of binary integers in a header extension containing fields for said first and second time stamps.

3. A method of transmitting real time signals as defined in claim 2, wherein said header extension further includes a field indicating that the packet is on a real time connection and a field indicating whether the packet is at the start of a real time episode or a continuation of a real time episode.

4. A method of transmitting real time signals as defined in claim 2, wherein an adopted time unit for measurement of time employed in said first and second time stamps is related to a reference frequency locked to said universal time measure by a multiplying constant derived from a power of 2.

5. A method of transmitting real time signals as defined in claim 4, wherein information identifying the frequency of said reference frequency at the source and the power of the multiplying constant is included in the header extension so that said adopted unit of time is recoverable at said destination and routing points.

6. A transmitting apparatus for transmitting real time signals at a source as digital data packets over a communications network, the transmitting apparatus comprising:

means for inserting first and second time stamps in each packet of a real time signal required to be transmitted at the source, said first time stamp indicating an elapsed time of real time information represented by data carried in the packet and said second time stamp indicating a time at which assembly of the packet at a source had occurred, and wherein said first and second time stamps are derived from a universal time measure available to the source, a destination and routing points in the communications network whereby, in use, timely transfer en route and time-faithful reconstruction of the real time signal at the destination is possible.

7. A transmitting apparatus for transmitting real time signals as defined in claim 6, wherein said means for inserting first and second time stamps includes a header extension generating means for generating a header extension for each packet of said real time signal, said header extension containing fields for said first and second time stamps.

8. A transmitting apparatus for transmitting real time signals as defined in claim 7, wherein said means for inserting first and second time stamps further includes a reference time clock generating means, which includes a reference oscillator for generating a reference frequency locked to said universal time measure, a multiplier for multiplying the reference frequency by a first multiplying constant, and first and second registers for latching start and finish times respectively of an interval of time that is spanned by a segment of the real time signal represented in a payload of a given packet.

9. A transmitting apparatus for transmitting real time signals as defined in claim 8, wherein said means for inserting first and second time stamps further includes means for calculating said first and second time stamps using the latched values of said start and finish times based on an adopted time unit for measurement of time related to said reference frequency by a second multiplying constant derived from a power of 2.

10. A transmitting apparatus for transmitting real time signals as defined in claim 7, wherein said header extension generator means also generates additional fields for indicting that the packet is on a real time connection and whether the packet is at the start of a real time episode or a continuation of a real time episode in said header extension.

11. A routing apparatus for routing real time signals as digital data packets over a communications network, the routing apparatus comprising:

means for retrieving first and second time stamps from each packet of a real time signal required to be routed, said first time stamp indicating an elapsed time of real time information represented by data carried in the packet and said second time stamp indicating a time at which assembly of the packet at a source had commenced, and wherein said time stamps are derived from a universal time measure available to the source, a destination and routing points in the communications network; and means for supervising dispatch of each of said packets in sequence by determining a target time for latest completion of dispatch of a next succeeding packet using the first time stamp in a packet whereby, in use, successive packets are substantially always dispatched ahead of, or on, a scheduled time.

12. A routing apparatus for routing real time signals as defined in claim 11, further comprising:

means for imposing an enforced wait in the timing of dispatch of a first packet by a predetermined time interval selected to be short enough to introduce an acceptable contribution by a routing apparatus to a total delay of the real time signal and long enough to provide sufficient time margins for the timely dispatch of subsequent packets.

13. A routing apparatus for routing real time signals as defined in claim 12, further comprising:

means for confirming that a packet is the next successive packet in sequence of the real time signal by comparing the second time stamp with a combination of the first time stamp and a second time stamp of a previous packet.

14. A routing apparatus for routing real time signals as defined in claim 12, wherein said means for imposing the enforced wait includes an enforced wait unit having a timer configured for generating said predetermined time interval, and memory means for temporarily storing the first and second time stamps of the first packet in a WAIT queue for the duration of said predetermined time interval, prior to transfer to another queue ready for dispatch.

15. A routing apparatus for routing real time signals as defined in claim 14, wherein said means for supervising dispatch includes a scheduling means for determining a deadline for the start of dispatch of a packet by taking the length of the packet, an output data channel link rate and the previously determined target time for latest completion of dispatch into account, said scheduling means also determining said target time for latest completion of dispatch of the next succeeding packet.

16. A routing apparatus for routing real time signals as defined in claim 15, wherein said means for supervising dispatch also includes a dispatch control means for checking that all deadlines previously set by the scheduling means can still be met and initiates a dispatch of the next packet before or on the scheduled deadline for start of dispatch.

17. A method of routing real time signals as digital data packets over a communications network, the method comprising:

retrieving first and second time stamps from each packet of a real time signal required to be routed, said first time stamp indicating an elapsed time of real time information represented by data carried in the packet and said second time stamp indicating a time at which assembly of the packet at a source had occurred, and wherein said first and second time stamps are derived from a universal time measure available to the source, a destination and routing points in the communications network; and supervising dispatch of each of said packets in sequence by determining a target time for latest completion of dispatch of a next succeeding packet using the first time stamp in a packet whereby, in use, successive packets are substantially always dispatched ahead of, or on, a scheduled time.

18. A method of routing real time signals as defined in claim 17, further comprising imposing an enforced wait in the timing of dispatch of a first packet by a predetermined time interval selected to be short enough to introduce an acceptable contribution by a routing apparatus to a total delay of the real time signal and long enough to provide sufficient time margins for the timely dispatch of subsequent packets.

19. A method of routing real time signals as defined in claim 18, further comprising temporarily storing the first and second time stamps of the first packet in a WAIT queue for the duration of said predetermined time interval, prior to transfer to another queue ready for dispatch.

20. A method of routing real time signals as defined in claim 18, further comprising confirming that a packet is the next successive packet in sequence of the real time signal by comparing the second time stamp with a combination of the first time stamp and a second time stamp of a previous packet.

21. A method of routing real time signals as defined in claim 17, wherein said supervising dispatch includes determining a deadline for the start of dispatch of a packet by taking the length of the packet, an output data channel link rate and the previously determined target time for latest completion of dispatch into account, and determining a target time for latest completion of dispatch of the next succeeding packet.

22. A method of routing real time signals as defined in claim 21, wherein said supervising dispatch also includes checking that all deadlines previously set can still be met and initiating a dispatch of the next packet before or on the scheduled deadline for start of dispatch.

23. A receiving apparatus for receiving real time signals as defined in claim 21, wherein said means for adjusting the presentation timing clock includes a reference clock generating means having a reference oscillator locked to said universal time measure, and first and second registers for latching start and finish times respectively of an interval of time spanned by a segment of the real time signal being presented at the destination.

24. A receiving apparatus for receiving real time signals as defined in claim 22, wherein said means for adjusting further comprises means for calculating a differential time from said start and finish times and means for comparing the differential time with said first time stamp, and means for using a result of the comparison to adjust the presentation timing clock.

25. A receiving apparatus for receiving real time signals at a destination as digital data packets over a communications network, the receiving apparatus comprising:

means for retrieving a first time stamp from a packet of a real time signal required to be presented at the destination, said first time stamp indicating an elapsed time of real time information represented by data carried in the packet, and wherein said first time stamp is derived from a universal time measure available to a source, the destination and routing points in the communications network;

a presentation timing clock for controlling the timing of presentation of the real time signal at the destination; and means for adjusting the presentation timing clock based on a comparison of the first time stamp with the actual time taken to present the real time information represented by the data carried in the packet whereby, in use, a timing clock at the source can be recovered to ensure time-faithful reconstruction of the real time signal at the destination.

26. A receiving apparatus for receiving real time signals as defined in claim 25, wherein said means for adjusting using the comparison to adjust the presentation timing clock comprises a phase locked loop provided in connection with a voltage controlled oscillator in a signal presentation unit in the receiving apparatus.

* * * * *